No. 777,935. PATENTED DEC. 20, 1904.
H. H. BOENKER.
WHEEL PLOW.
APPLICATION FILED MAR. 22, 1904.
NO MODEL. 3 SHEETS—SHEET 1.
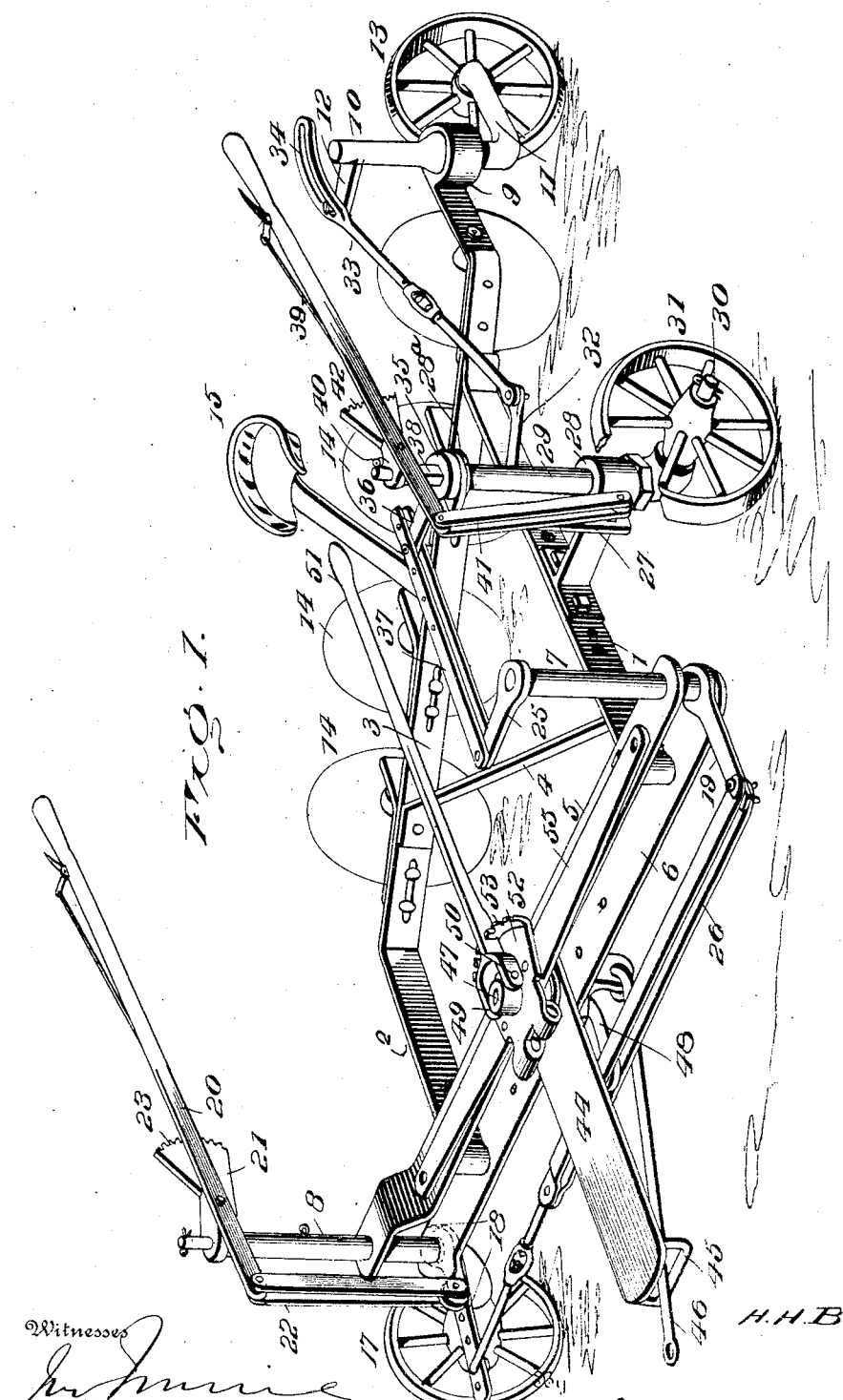

No. 777,935. PATENTED DEC. 20, 1904.
H. H. BOENKER.
WHEEL PLOW.
APPLICATION FILED MAR. 22, 1904.
NO MODEL. 3 SHEETS—SHEET 2.
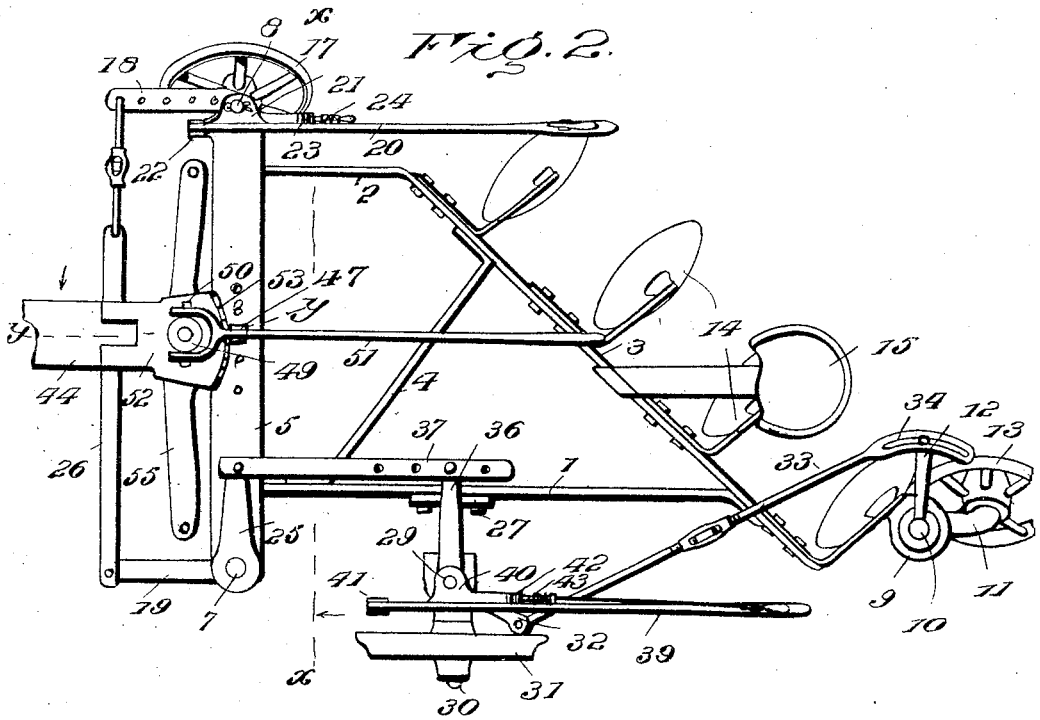
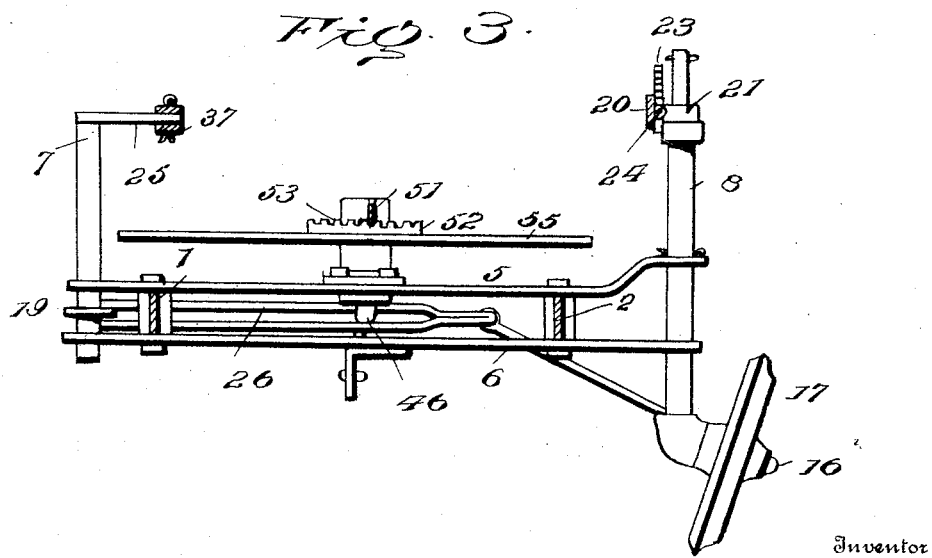
Inventor
H. H. Boenker
By R. S. & A. B. Lacey Attorneys
Witnesses No. 777,935. PATENTED DEC. 20, 1904.
H. H. BOENKER.
WHEEL PLOW.
APPLICATION FILED MAR. 22, 1904.
NO MODEL. 3 SHEETS—SHEET 3.
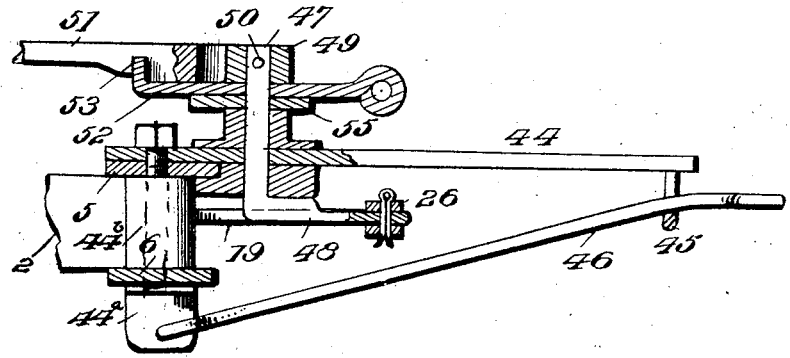
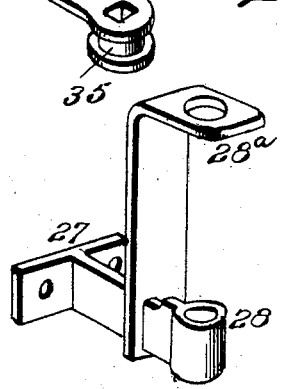
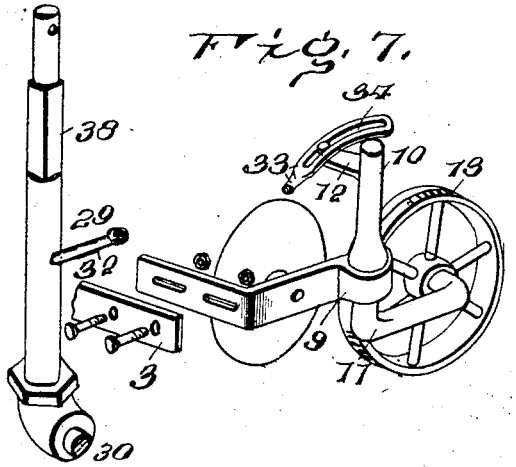
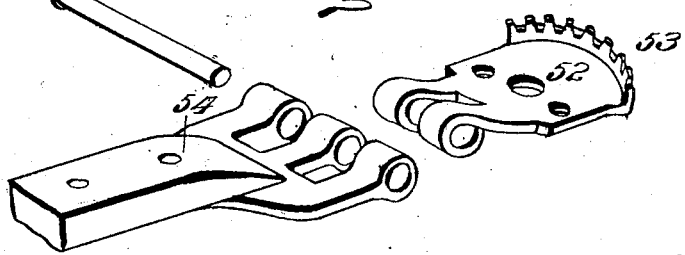
Witnesses
Inventor
H. H. Boenker
By
R. S. & A. B. Lacey, Attorneys No. 777,935. Patented December 20, 1904.

UNITED STATES PATENT OFFICE.

HENRY H. BOENKER, OF ST. CHARLES, MISSOURI.

WHEEL-PLOW.

SPECIFICATION forming part of Letters Patent No. 777,935, dated December 20, 1904.

Application filed March 22, 1904. Serial No. 199,414.

*To all whom it may concern:*

Be it known that I, HENRY H. BOENKER, a citizen of the United States, residing at St. Charles, in the county of St. Charles and State of Missouri, have invented certain new and useful Improvements in Wheel-Plows, of which the following is a specification.

This invention appertains to agricultural implements, and most especially to the kind designed for cultivating and preparing the soil for the planting of seed.

The implement embodies a gang of earth-treating devices, which may be disks or plows of any of the usual types, according to the nature of the work and the special character of the machine.

The invention has relation most especially to the general structure, to the peculiar mountings of the parts, and to the means whereby the working elements are adjustable either by hand or through the instrumentality of the draft.

An essential feature of the invention is the arrangement of the ground-wheels and the parts coöperating therewith, whereby the machine is enabled to make a short turn or to be quickly swerved from a direct line in order to avoid an obstruction or for any desired purpose.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a wheel-plow embodying the invention. Fig. 2 is a top plan view thereof. Fig. 3 is a section on the line X X of Fig. 2 looking to the front as indicated by the arrows. Fig. 4 is a longitudinal section on the line Y Y of Fig. 2 looking in the direction of the arrow, showing the parts on a larger scale. Fig. 5 is a detail view in perspective of the bracket in which the stem of the land-wheel is adjustably mounted. Fig. 6 is a detail perspective view of the guide-plate to which the pole or tongue is adapted to be connected when the implement is to be drawn over the field by horse-power. Fig. 7 is a detail view showing the manner of adjustably connecting the rear bracket to the diagonal bar.

Corresponding and like parts are referred to in the following description and indicated in all the views of the drawings by the same reference characters.

The main frame of the implement comprises longitudinal bars 1 and 2, a diagonal or transversely-inclined bar 3, brace 4, and front transverse bar composed of complemental parts 5 and 6, having their end portions projected beyond the longitudinal bars 1 and 2 and provided with vertically-alined openings in which are journaled posts 7 and 8, connected for simultaneous rotation in the manner presently to be described. The diagonal or transversely-inclined bar 3 has the gang of plows or earth-treating devices attached thereto, and the direction of inclination will depend upon the style of the implement—that is, whether designed for right-hand or left-hand work. The elements 2 and 3 are preferably parts of a single bar which is bent upon itself at a point between its ends. The front ends of the longitudinal bars 1 and 2 are received between the members 5 and 6, comprising the front transverse bar, and are bolted or otherwise connected thereto. The rear portion of the diagonal bar 3 extends beyond the longitudinal bar 1 and receives a bracket 9, which is adjustably connected thereto to admit of shifting said bracket along the bar 3 toward and from the longitudinal bar 1. The rear end of the bracket 9 is vertically apertured to receive a post 10, having crank-arm 11 at its lower end and crank-arm 12 at its upper end. A ground-wheel 13 is mounted upon the spindle of the crank-arm 11 and constitutes a trailer or rear furrow-wheel.

The gang of plows or earth-treating devices 14 may be of any desired type, such as usually employed in an implement of this character. As shown, the plows are of the disk variety and are arranged in the manner well understood so as to turn furrows of greater or less width, as may be desired. The plows or earth-treating devices have detachable and adjustable connection with the diagonal or transversely-inclined bar 3 to admit of a greater or less number of furrows being formed at one operation and the distance between the same varied to meet conditions of soil and work. The driver's seat 15 is preferably connected to the bar 3, although it may be attached to any convenient part of the frame.

The post 8 is provided at its lower end with an outwardly and downwardly inclined spindle 16, upon which is mounted a ground-wheel 17, constituting a furrow-wheel. The post 8 is mounted in the front transverse bar, so as to move vertically and to turn, whereby provision is had for adjusting the frame and shifting the furrow-wheel for steering. An arm 18 projects forward from the lower end of the post 8 and is connected with a corresponding arm 19, projected forward from the lower end of the post 7, whereby the two posts 7 and 8 move in unison when the implement is deflected from a direct course. An operating-lever 20 is fulcrumed to a support 21, loosely mounted upon the upper end of the post 8, and its front end is connected by link 22 to the adjacent end of the front transverse bar. Upon raising or lowering the rear end of the operating-lever 20 the furrow side of the frame is correspondingly moved, thereby regulating the depth of the furrows formed by the plows. The operating-lever 20 is held in the adjusted position by means of a notched segment 23 and hand-operated latch 24. The rear end of the operating-lever extends within convenient reach of the driver's seat 15.

The post 7 is mounted in the front transverse bar for rotary movement only and is provided at its lower end with the arm 19 and at its upper end with an arm 25, which is arranged some distance above the plane of the frame. The arms 18 and 19 are joined by means of a transverse connection 26, which is adapted to be lengthened and shortened to admit of nicety of adjustment, a turnbuckle being interposed in the length for this purpose. The transverse connection 26 is likewise adapted to be adjustably connected with the arm 18, so as to vary the leverage and admit of a differential movement being obtained between the posts 7 and 8 as may be desired.

A bracket 27 is adjustably connected with the longitudinal bar 1, being shiftable along said bar to admit of leveling the machine according to the relative position of the plows. This bracket is provided with a sleeve 28 and an arm 28ª, the latter having its upper end bent and provided with an opening in vertical alinement with said sleeve. A post or stem 29 is mounted in said sleeve and bent ends of the arm 28ª, so as to have angular and vertical adjustment, and is provided at its lower end with a spindle 30, upon which is mounted a ground-wheel 31, constituting the land-wheel. An arm 32 projects outward and rearward from the post 29 and is connected, by means of a rod 33, with the crank-arm 12 of the post 10. The rod 33 is adapted to be lengthened and shortened, and this is accomplished by the usual turnbuckle interposed in its length. The rear portion of the rod 33 is curved and slotted, as shown at 34, and receives the pin or crank portion of the arm 12. When the implement is turned to the right, the trailer or rear furrow-wheel 13 is adapted to move freely, the crank portion of the arm 12 traveling in the slot 34, thereby enabling the machine to make a short turn. When the machine is moving forward or turns to the left, the front portion of the arm 12 bears against the front end of the slot 34, so as to hold the trailer or rear furrow-wheel rigid, thereby causing the implement to run steady.

A collar 35 is journaled in the bent end of the arm 28 and is provided with an angular opening and with an arm 36, which latter is connected, by means of the link 37, to the arm 25, whereby the posts 7 and 29 are adapted to turn in unison. The link 37 has adjustable connection with the arm 36 to admit of varying the position of the land-wheel 31 with reference to the furrow-wheel 17. The upper portion of the post 29 is made angular, as shown at 38, to snugly fit the angular opening of the collar 35, whereby said post and arm 36 turn together. The post 29 is adjustable vertically with reference to the bracket and is adapted to be turned at any adjusted position. An operating-lever 39, fulcrumed to a support 40, loosely mounted upon the upper end of the post 29, is connected by link 41 with the outer end of the bracket 27, and the rear end of said lever extends within convenient reach of the driver's seat, so as to be moved vertically when it is required to adjust the landside of the machine to regulate the depth of furrows. The operating-lever 39 is held in the adjusted position by the usual toothed segment 42 and hand-latch 43.

A tongue 44 projects forward from the front transverse bar of the frame and is adapted to be adjustably connected thereto, so as to be shifted to one side or the other of a medial line, according to the lateral stress to be neutralized when the machine is in operation. As indicated most clearly in Fig. 4, a bolt 44ª passes through openings in the parts 5 and 6 and through an opening in the tongue 44 and receives a sleeve 44ᵇ, the latter being arranged between the parts 5 and 6 to hold them apart the proper distance. Corresponding openings are formed in the parts 5 and 6 for the reception of the bolt 44ª. A loop 45 is provided at the front end of the tongue 44 and the draw-bar 46 is supported therein, the rear end of the draw-bar being attached to the front bar of the frame. The steering-post 47 is preferably journaled to the tongue and is provided at its lower end with an arm 48, which is fastened to the transverse connection 26, so as to move therewith. A collar 49 is secured to the upper end of the steering-post in any determinate way, as by means of the pin 50, the end portions of the latter projecting beyond the sides of the collar to receive the fork members of the steering-lever 51, which extends within convenient reach of the driver's seat to admit of directing the machine by hand when required. A guide-plate 52 is loosely mounted upon the steering-post and is provided at its rear end with a toothed rim 53 for engagement of the steering-lever 51 to compel synchronous movement of the guide-plate and steering-post. The pole or tongue 54 is coupled to the guide-plate 52 when the implement is to be drawn over the field by horse-power. A steering-bar 55 is loosely mounted upon the steering-post and is connected to the guide-plate 52 and is utilized only when the implement is to be connected to a traction-engine or other mechanically-propelled machine. When the implement is drawn over the field by a traction-engine or analogous means, it is coupled to said machine by means of the draw-bar 46, and the end portions of the steering-bar 55 are connected to the steering mechanism of said machine in the well-known manner, thereby admitting of a turn being effected in the smallest space possible when it is required to recross the field. It is to be understood that the pole or tongue 54 is removed when the implement is coupled to a traction-engine. When the implement is to be drawn over the field by horse-power, the steering-bar 55 is omitted. When the steering-lever 51 is connected to the guide-plate 52, the steering is effected direct by means of the draft, and when the steering-lever is disconnected from the guide-plate by moving it out of engagement with the toothed rim 53 the implement may be steered by hand.

The implement is supported upon the three ground-wheels 13, 17, and 31, and the plows are adjustable in gang by moving the frame vertically with reference to the ground-wheels 17 and 31, either side being independently adjustable to adapt the machine to the roll of the ground, whereby provision is had for uniformity of work. In the event of a narrow track only being required to be drilled or worked one or more plows near the outer rear end of the bar 3 are removed, and to equalize the machine upon the supporting-wheels the bracket 27 is adjustable along the bar 1. This operation requires varying the length of the connections 33 and 37, which is effected by the means disclosed. When turning to the left, the ground-wheels 13, 17, and 31 are positively moved, by means of the steering mechanism, to admit of the machine practically turning in its length. When turning the implement to the right, the ground-wheels 17 and 31 are positively moved by the means and in the manner stated, and the ground-wheel 13 has a limited play. The ground-wheel 31 may be readily moved in a vertical direction without changing the relation of the link 37 and arms 25 and 36 to the plane of the frame. In order that the ground-wheel 17 may be relatively adjusted vertically without causing binding of the connection 26, the latter is composed of parts loosely connected, thereby admitting of the major portion moving with the main frame when shifted to regulate the depth of cultivation.

Having thus described the invention, what is claimed as new is—

1. In an agricultural implement, the combination of the main frame comprising a diagonal bar and provided with earth-treating devices, oppositely-disposed ground-wheels, a bracket adjustable along said diagonal bar, a post vertically journaled in said bracket and provided with a crank-arm carrying a trailer and having an upper crank-arm, and connecting means between the last-mentioned crank-arm and the aforesaid ground-wheels to compel positive movement of the trailer and ground-wheels to effect short turning of the implement, substantially as set forth.

2. In combination, a main frame provided with earth-treating devices, a trailer and furrow-wheel arranged at diagonally opposite portions of the frame, a bracket arranged at a point between the trailer and furrow-wheel and adjustable along the main frame, a land-wheel supported by means of said bracket, and connecting means between the several wheels to effect simultaneous movement thereof, substantially as set forth.

3. In combination, a main frame provided with earth-treating devices, a bracket adjustable longitudinally of the main frame, a post journaled to said bracket and provided with a ground-wheel, means for vertically adjusting the last-mentioned post to vary the depth of action of the earth-treating devices, a second post at or near the front end of the frame, steering mechanism connected with the last-mentioned post, arms extended from the two posts, and a link adjustably connecting the two arms to admit of adjustment of the bracket and of independent adjustment of the ground-wheel, substantially as set forth.

4. In combination, a main frame provided with earth-treating devices, a steering-post, a post provided with a ground-wheel, a third post intermediate of the ground-wheel and steering-posts, angularly-disposed arms at opposite ends of said third post, and connecting means between said arms and corresponding arms of the steering and ground-wheel posts to cause synchronous movement thereof, substantially as set forth.

In testimony whereof I affix my signature in presence of two witnesses.

HENRY H. BOENKER. [L. S.]

Witnesses:
 RIEKA BOEDEKER,
 OSMUND HAENSSLER.